United States Patent
Chang et al.

(10) Patent No.: US 9,753,575 B2
(45) Date of Patent: Sep. 5, 2017

(54) IN-CELL TOUCH SCREEN AND A CONTROLLER ADAPTED THERETO

(71) Applicant: HIMAX TECHNOLOGIES LIMITED, Tainan (TW)

(72) Inventors: Yaw-Guang Chang, Tainan (TW); Wei-Song Wang, Tainan (TW)

(73) Assignee: Himax Technologies Limited, Tainan (TW)

( * ) Notice: Subject to any disclaimer, the term of this patent is extended or adjusted under 35 U.S.C. 154(b) by 67 days.

(21) Appl. No.: 15/007,018

(22) Filed: Jan. 26, 2016

(65) Prior Publication Data

US 2017/0139523 A1    May 18, 2017

Related U.S. Application Data

(60) Provisional application No. 62/257,081, filed on Nov. 18, 2015.

(51) Int. Cl.
G06F 3/045 (2006.01)
G06F 3/041 (2006.01)
G06F 3/044 (2006.01)

(52) U.S. Cl.
CPC ............ *G06F 3/0416* (2013.01); *G06F 3/044* (2013.01); *G06F 3/0412* (2013.01)

(58) Field of Classification Search
None
See application file for complete search history.

(56) References Cited

U.S. PATENT DOCUMENTS

2011/0115733 A1* 5/2011 Shih ...................... G06F 3/0412
345/173

* cited by examiner

*Primary Examiner* — Adam R Giesy
(74) *Attorney, Agent, or Firm* — Donald E. Stout; Stout, Uxa & Buyan, LLP

(57) ABSTRACT

A controller adapted to an in-cell touch screen includes a common voltage (VCOM) circuit generating a common voltage at an output node of the VCOM circuit, and a detecting circuit receiving a sensing signal at an input/output node of the detecting circuit. A display-mode switch is closed in a display mode such that a VCOM electrode is set at the common voltage, and a touch-sensing-mode switch is closed in a touch sensing mode such that the sensing signal from the VCOM electrode is received and processed by the detecting circuit. The detecting circuit has full-swing power that contains full-swing power of the VCOM circuit.

20 Claims, 3 Drawing Sheets

300

IN-CELL TOUCH SCREEN AND A CONTROLLER ADAPTED THERETO

CROSS-REFERENCE TO RELATED APPLICATIONS

This application claims the benefit of U.S. Provisional Application No. 62/257,081, filed on Nov. 18, 2015, the entire contents of which are herein expressly incorporated by reference.

BACKGROUND OF THE INVENTION

1. Field of the Invention

The present invention generally relates to an in-cell touch screen, and more particularly to a controller adapted to a self-capacitance in-cell touch screen.

2. Description of Related Art

A touch screen is an input/output device that combines touch technology and display technology to enable users to directly interact with what is displayed. A capacitor-based touch panel is a commonly used touch panel that utilizes capacitive coupling effect to detect touch position. Specifically, capacitance corresponding to the touch position changes and is thus detected, when a finger touches a surface of the touch panel.

In order to produce thinner touch screens, in-cell technology has been adopted that eliminates one or more layers by building capacitors inside the display. In conventional in-cell touch screens, a common voltage (VCOM) layer is used in a display mode and a touch sensing mode. The common voltage in the display mode usually has a negative voltage level, while a sensing signal induced on receiving (RX) electrodes of the VCOM layer in the touch sensing mode usually has a positive voltage level, resulting in a spanning voltage exceeding the operating voltage of metal-oxide-semiconductor (MOS) transistors implementing switches that alternate the display mode and the touch sensing mode. Accordingly, an additional circuit is thus required to supplement the switches to solve the spanning (positive to negative) voltage problem. Alternatively, MOS transistors with high operating voltage are used instead to implement the switches in order to solve the spanning voltage problem. Unfortunately, either scheme causes increase in circuit area. Therefore, a need has arisen to propose a novel scheme for reduction of circuit area for in-cell touch screens.

SUMMARY OF THE INVENTION

In view of the foregoing, it is an object of the embodiment of the present invention to provide a controller adapted to a self-capacitance in-cell touch screen to inhibit spanning voltage problem without increasing chip area for the in-cell touch screen.

According to one embodiment, a controller adapted to an in-cell touch screen includes a common voltage (VCOM) circuit, a display-mode switch, a detecting circuit and a touch-sensing-mode switch. The VCOM circuit generates a common voltage at an output node of the VCOM circuit. The display-mode switch has a first end connected with the output node of the VCOM circuit, and has a second end connected with a VCOM electrode via an associated connecting line of the in-cell touch screen. The detecting circuit receives a sensing signal at an input/output node of the detecting circuit. The touch-sensing-mode switch has a first end connected with the input/output node of the detecting circuit, and has a second end connected with the VCOM electrode via the associated connecting line of the in-cell touch screen. The display-mode switch is closed in a display mode such that the VCOM electrode is set at the common voltage, and the display-mode switch is open in a touch sensing mode. The touch-sensing-mode switch is closed in the touch sensing mode such that the sensing signal from the VCOM electrode is received and processed by the detecting circuit, and the touch-sensing-mode switch is open in the display mode. The detecting circuit has full-swing power that contains full-swing power of the VCOM circuit.

DETAILED DESCRIPTION OF THE INVENTION

Figure 1:
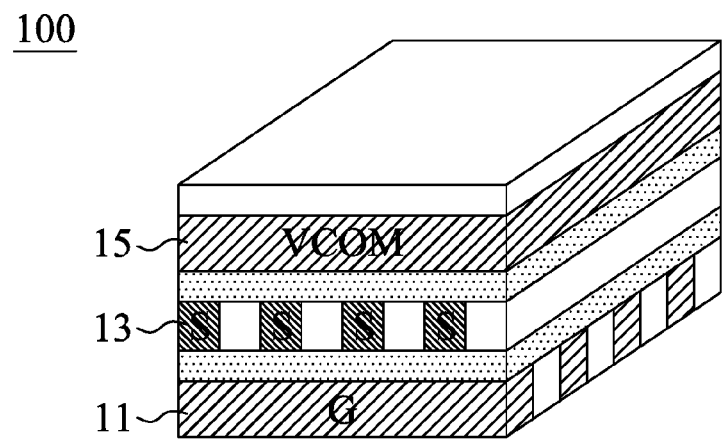
FIG. 1 schematically shows a perspective view of a self-capacitance in-cell touch screen according to an embodiment of the present invention.

FIG. 1 schematically shows a perspective view of a self-capacitance in-cell touch screen 100 according to an embodiment of the present invention. The self-capacitance in-cell touch screen (hereinafter in-cell touch screen) 100 primarily includes, from bottom up, gate (G) lines 11, source (S) lines 13 and a common voltage (VCOM) layer 15, which are isolated from each other. For brevity, some components of the in-cell touch screen 100 are not shown. For example, a liquid crystal layer may be disposed above the VCOM layer 15. Specifically, gate lines 11 are disposed latitudinally or in rows, and source lines 13 are disposed longitudinally or in columns.

Figure 2:
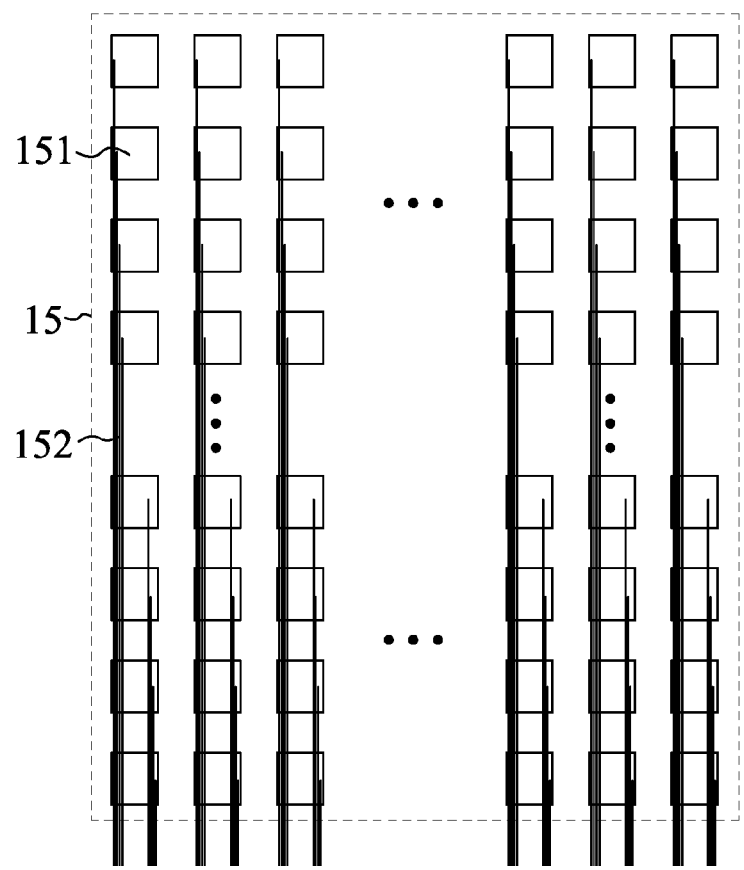
FIG. 2 shows a top view of the VCOM layer of FIG. 1.

FIG. 2 shows a top view of the VCOM layer 15 of FIG. 1. In the embodiment, the VCOM layer 15 is divided into a plurality of VCOM electrodes 151 arranged in an array as exemplified in FIG. 2. A plurality of connecting lines 152 connect the VCOM electrodes 151, respectively. The VCOM electrodes 151 act as sensing points (or receiving (RX) electrodes) in a touch sensing mode, and the VCOM electrodes 151 are connected to a common voltage, e.g., a direct-current (DC) voltage, in a display mode.

Figure 3:
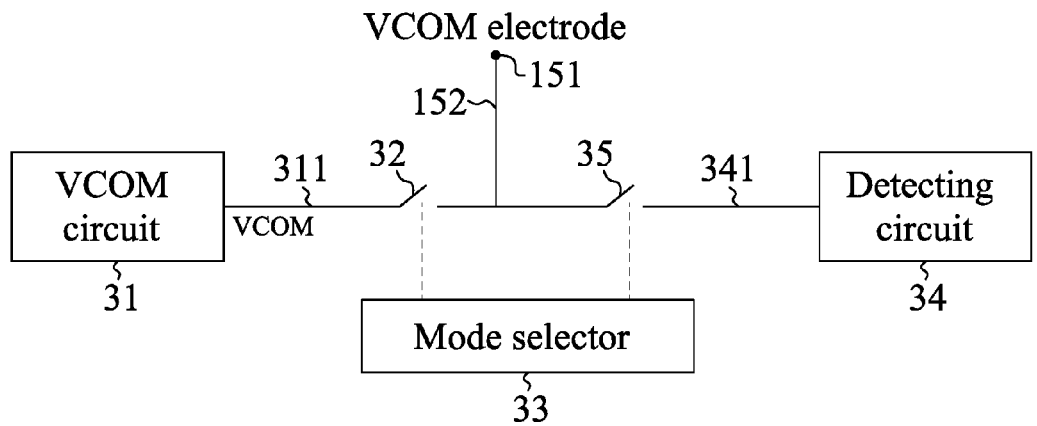
FIG. 3 shows a schematic diagram illustrated of a controller adapted to the in-cell touch screen of FIG. 1.

FIG. 3 shows a schematic diagram illustrated of a controller 300 adapted to the in-cell touch screen 100 of FIG. 1. In the embodiment, the controller 300 includes a VCOM circuit 31 configured to generate a common voltage VCOM at an output node 311 of the VCOM circuit 31. The controller 300 also includes a display-mode switch 32, which has a first end connected with the output node 311 of the VCOM circuit 31, and has a second end connected with the VCOM electrode 151 via an associated connecting line 152. The display-mode switch 32 is closed in the display mode under control of a mode selector 33, such that the VCOM electrode 151 is set at the common voltage VCOM. On the other hand, the display-mode switch 32 is open in the touch sensing mode under control of the mode selector 33.

The controller 300 of the embodiment further includes a detecting circuit 34 configured to receive a sensing signal at an input/output node 341 of the detecting circuit 34 in order to output a transmit (TX) signal and then detect a touch event. The controller 300 also includes a touch-sensingmode switch 35, which has a first end connected with the input/output node 341 of the detecting circuit 34, and has a second end connected with the VCOM electrode 151 via an associated connecting line 152. The touch-sensing-mode switch 35 is closed in the touch sensing mode under control of the mode selector 33, such that the sensing signal from the VCOM electrode 151 may be received and processed by the detecting circuit 34. On the other hand, the touch-sensing-mode switch 35 is open in the display mode under control of the mode selector 33. It is noted that the display-mode switch 32 and the touch-sensing-mode switch 35 each may be implemented by one MOS transistor without using additional circuits as in the prior art.

Figure 4A:
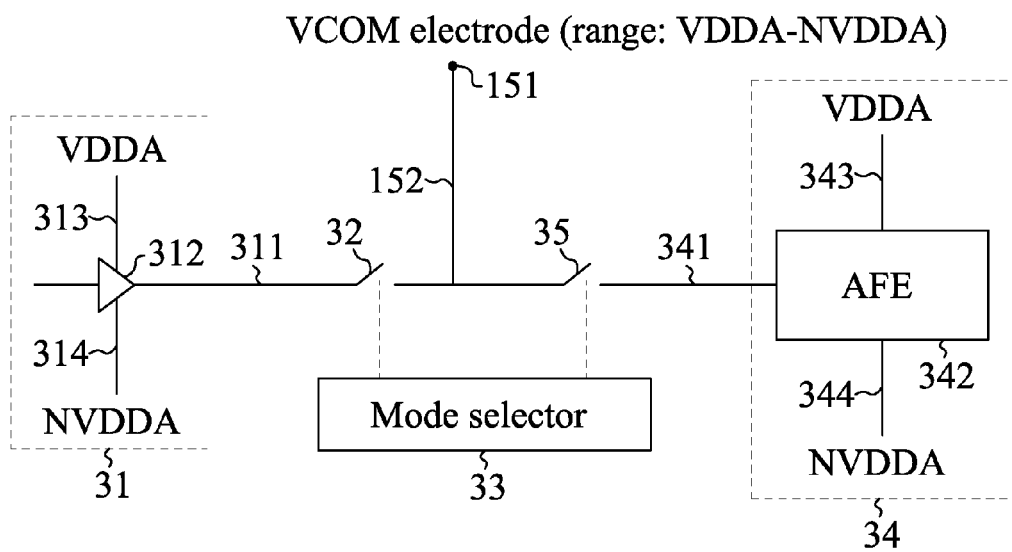
FIG. 4A to FIG. 4C show circuit diagrams of the controller of FIG. 3 according to specific embodiments of the invention.

FIG. 4A shows a circuit diagram of the controller 300 of FIG. 3 according to a first specific embodiment of the invention. In the embodiment, the VCOM circuit 31 may include an amplifier 312, for example, an operational amplifier, at an output stage thereof. The detecting circuit 34 may include an analog front-end (AFE) 342 at an input stage thereof, configured to interface the VCOM electrode 151 to a latter stage, for example, an analog to digital converter (not shown). According to one aspect of the embodiment, the amplifier 312 of the VCOM circuit 31 has a first power input node 313 receiving a positive voltage VDDA, and a second power input node 314 receiving a negative voltage NVDDA. The amplifier 312 therefore has a power input spanning from the positive voltage VDDA to the negative voltage NVDDA, and has full-swing power of VDDA-NVDDA. On the other hand, the AFE 342 of the detecting circuit 34 has a first power input node 343 receiving the positive voltage VDDA, and a second power input node 344 receiving the negative voltage NVDDA. The AFE 342 therefore has a power input spanning from the positive voltage VDDA to the negative voltage NVDDA, and has full-swing power of VDDA-NVDDA. Accordingly, the full-swing power of the amplifier 312 of the VCOM circuit 31 is substantially equal to the full-swing power of the AFE 342 of the detecting circuit 34.

As the full-swing power of VDDA-NVDDA covers a voltage level of a common voltage in the display mode and also covers a voltage level of a sensing signal at the VCOM electrode 151 in the touch sensing mode, spanning voltage problem can thus be inhibited.

Figure 4B:
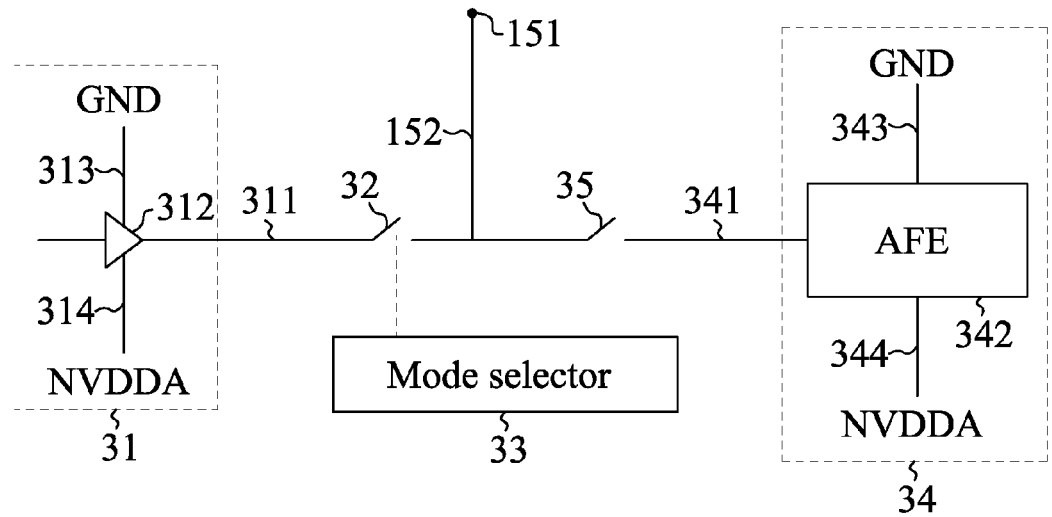

FIG. 4B shows a circuit diagram of the controller 300 of FIG. 3 according to a second specific embodiment of the invention. The circuit shown in FIG. 4B is similar to that in FIG. 4A, with the distinctness described below. Specifically, the amplifier 312 of the VCOM circuit 31 has the first power input node 313 receiving ground GND, and the second power input node 314 receiving the negative voltage NVDDA. The amplifier 312 therefore has a power input spanning from the ground GND to the negative voltage NVDDA, and has full-swing power of 0-NVDDA (or –NVDDA). On the other hand, the AFE 342 of the detecting circuit 34 has the first power input node 343 receiving the ground GND, and the second power input node 344 receiving the negative voltage NVDDA. The AFE 342 therefore has a power input spanning from the ground GND to the negative voltage NVDDA, and has full-swing power of 0-NVDDA (or –NVDDA). Accordingly, the full-swing power of the amplifier 312 of the VCOM circuit 31 is substantially equal to the full-swing power of the AFE 342 of the detecting circuit 34, thereby inhibiting the in-cell touch screen 100 from incurring spanning voltage problem.

Figure 4C:
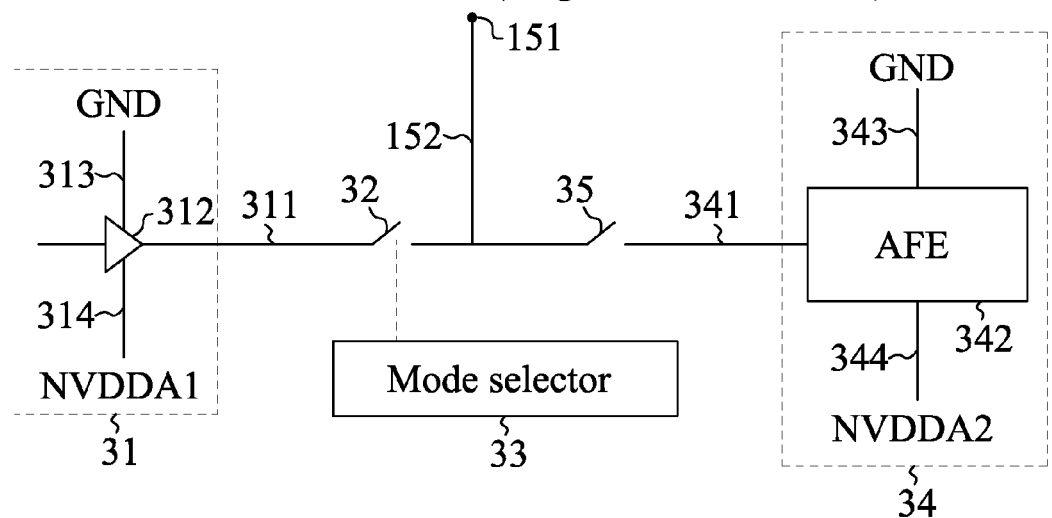

FIG. 4C shows a circuit diagram of the controller 300 of FIG. 3 according to a third specific embodiment of the invention. The circuit shown in FIG. 4C is similar to that in FIG. 4A, with the distinctness described below. Specifically, the amplifier 312 of the VCOM circuit 31 has the first power input node 313 receiving the ground GND, and the second power input node 314 receiving a first negative voltage NVDDA1. The amplifier 312 therefore has a power input spanning from the ground GND to the first negative voltage NVDDA1, and has full-swing power of 0-NVDDA1 (or –NVDDA1). On the other hand, the AFE 342 of the detecting circuit 34 has the first power input node 343 receiving the ground GND, and the second power input node 344 receiving a second negative voltage NVDDA2 (magnitude or absolute value of NVDDA2 is greater than magnitude of NVDDA1). The AFE 342 therefore has a power input spanning from the ground GND to the second negative voltage NVDDA2, and has full-swing power of 0-NVDDA2 (or –NVDDA2). Accordingly, the full-swing power of the AFE 342 of the detecting circuit 34 is greater than the full-swing power of the amplifier 312 of the VCOM circuit 31, thereby inhibiting the in-cell touch screen 100 from incurring spanning voltage problem.

Generally speaking, the AFE 342 of the detecting circuit 34 has full-swing power that contains full-swing power of the amplifier 312 of the VCOM circuit 31. In other words, the full-swing power of the amplifier 312 of the VCOM circuit 31 is within or in the bounds of the full-swing of the AFE 342 of the detecting circuit 34.

Specifically, the amplifier 312 of the VCOM circuit 31 has the first power input node 313 receiving a voltage level being equal to or greater than the ground GND, and the AFE 342 of the detecting circuit 34 has the first power input node 343 receiving a voltage level being substantially the same as the voltage level of the first power input node 313. The AFE 342 of the detecting circuit 34 has the second power input node 344 receiving a negative voltage that has magnitude (or absolute value) being equal to or greater than a voltage level of the second power input node 314 of the amplifier 312.

Although specific embodiments have been illustrated and described, it will be appreciated by those skilled in the art that various modifications may be made without departing from the scope of the present invention, which is intended to be limited solely by the appended claims.

What is claimed is:

1. A controller adapted to an in-cell touch screen, comprising:

a common voltage (VCOM) circuit generating a common voltage at an output node of the VCOM circuit;

a display-mode switch having a first end connected with the output node of the VCOM circuit, and having a second end connected with a VCOM electrode via an associated connecting line of the in-cell touch screen;

a detecting circuit receiving a sensing signal at an input/output node of the detecting circuit; and a touch-sensing-mode switch having a first end connected with the input/output node of the detecting circuit, and having a second end connected with the VCOM electrode via the associated connecting line of the in-cell touch screen;

wherein the display-mode switch is closed in a display mode such that the VCOM electrode is set at the common voltage, and the display-mode switch is open in a touch sensing mode;

wherein the touch-sensing-mode switch is closed in the touch sensing mode such that the sensing signal from the VCOM electrode is received and processed by the detecting circuit, and the touch-sensing-mode switch is open in the display mode;

wherein the detecting circuit has full-swing power that contains full-swing power of the VCOM circuit.

2. The controller of claim 1, wherein the in-cell touch screen is a self-capacitance in-cell touch screen.

3. The controller of claim 1, wherein the display-mode switch and the touch-sensing-mode switch each is consisted of a single metal-oxide-semiconductor (MOS) transistor.

4. The controller of claim 1, further comprising a mode selector that controls the display-mode switch and the touch-sensing-mode switch.

5. The controller of claim 1, wherein the VCOM circuit comprises an amplifier at an output stage thereof.

6. The controller of claim 1, wherein the detecting circuit comprises an analog front-end (AFE) at an input stage thereof to interface the VCOM electrode to a latter stage of the detecting circuit.

7. The controller of claim 1, wherein the VCOM circuit has a first power input node receiving a voltage level being equal to or greater than ground, and the detecting circuit has a first power input node receiving a voltage level being substantially the same as the voltage level of the first power input node of the VCOM circuit; and the detecting circuit has a second power input node receiving a negative voltage that has magnitude being equal to or greater than a voltage level of a second power input node of the VCOM circuit.

8. The controller of claim 7, wherein the first power input node of the VCOM circuit receives a positive voltage, and the second power input node of the VCOM circuit receives the negative voltage; and the first power input node of the detecting circuit receives the positive voltage, and the second power input node of the detecting circuit receives the negative voltage.

9. The controller of claim 7, wherein the first power input node of the VCOM circuit receives the ground, and the second power input node of the VCOM circuit receives the negative voltage; and the first power input node of the detecting circuit receives the ground, and the second power input node of the detecting circuit receives the negative voltage.

10. The controller of claim 7, wherein the first power input node of the VCOM circuit receives the ground, and the second power input node of the VCOM circuit receives a first negative voltage; and the first power input node of the detecting circuit receives the ground, and the second power input node of the detecting circuit receives a second negative voltage with magnitude being greater than magnitude of the first negative voltage.

11. An in-cell touch screen, comprising:
a common voltage (VCOM) layer including a plurality of VCOM electrodes, the VCOM electrodes acting as sensing points in a touch sensing mode, and the VCOM electrodes being connected to a common voltage in a display mode;
a plurality of connecting lines connecting the VCOM electrodes respectively;
a VCOM circuit generating the common voltage at an output node of the VCOM circuit;
a display-mode switch having a first end connected with the output node of the VCOM circuit, and having a second end connected with the VCOM electrode via an associated connecting line;
a detecting circuit receiving a sensing signal at an input/output node of the detecting circuit; and
a touch-sensing-mode switch having a first end connected with the input/output node of the detecting circuit, and having a second end connected with the VCOM electrode via the associated connecting line;
wherein the display-mode switch is closed in the display mode such that the VCOM electrode is set at the common voltage, and the display-mode switch is open in the touch sensing mode;
wherein the touch-sensing-mode switch is closed in the touch sensing mode such that the sensing signal from the VCOM electrode is received and processed by the detecting circuit, and the touch-sensing-mode switch is open in the display mode;
wherein the detecting circuit has full-swing power that contains full-swing power of the VCOM circuit.

12. The in-cell touch screen of claim 11, wherein the in-cell touch screen is a self-capacitance in-cell touch screen.

13. The in-cell touch screen of claim 11, wherein the display-mode switch and the touch-sensing-mode switch each is consisted of a single metal-oxide-semiconductor (MOS) transistor.

14. The in-cell touch screen of claim 11, further comprising a mode selector that controls the display-mode switch and the touch-sensing-mode switch.

15. The in-cell touch screen of claim 11, wherein the VCOM circuit comprises an amplifier at an output stage thereof.

16. The in-cell touch screen of claim 11, wherein the detecting circuit comprises an analog front-end (AFE) at an input stage thereof to interface the VCOM electrode to a latter stage of the detecting circuit.

17. The in-cell touch screen of claim 11, wherein the VCOM circuit has a first power input node receiving a voltage level being equal to or greater than ground, and the detecting circuit has a first power input node receiving a voltage level being substantially the same as the voltage level of the first power input node of the VCOM circuit; and the detecting circuit has a second power input node receiving a negative voltage that has magnitude being equal to or greater than a voltage level of a second power input node of the VCOM circuit.

18. The in-cell touch screen of claim 17, wherein the first power input node of the VCOM circuit receives a positive voltage, and the second power input node of the VCOM circuit receives the negative voltage; and the first power input node of the detecting circuit receives the positive voltage, and the second power input node of the detecting circuit receives the negative voltage.

19. The in-cell touch screen of claim 17, wherein the first power input node of the VCOM circuit receives the ground, and the second power input node of the VCOM circuit receives the negative voltage; and the first power input node of the detecting circuit receives the ground, and the second power input node of the detecting circuit receives the negative voltage.

20. The in-cell touch screen of claim 17, wherein the first power input node of the VCOM circuit receives the ground, and the second power input node of the VCOM circuit receives a first negative voltage; and the first power input node of the detecting circuit receives the ground, and the second power input node of the detecting circuit receives a second negative voltage with magnitude being greater than magnitude of the first negative voltage.

* * * * *